United States Patent
Sawada et al.

(10) Patent No.: US 7,328,917 B2
(45) Date of Patent: Feb. 12, 2008

(54) STEERING DEVICE (75) Inventors: Naoki Sawada, Maebashi (JP); Shuhei Ikeda, Maebashi (JP); Jun Yamada, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/513,818

(22) PCT Filed: Apr. 18, 2003

(86) PCT No.: PCT/JP03/04952

§ 371 (c)(1),
(2), (4) Date: May 23, 2005

(87) PCT Pub. No.: WO03/095286

PCT Pub. Date: Nov. 20, 2003

(65) Prior Publication Data
US 2005/0236825 A1 Oct. 27, 2005

(30) Foreign Application Priority Data
May 10, 2002 (JP) .............................. 2002-135251

(51) Int. Cl.
*B62D 1/18* (2006.01)
(52) U.S. Cl. ......................................... 280/775; 74/493
(58) Field of Classification Search ................ 280/775; 74/493
See application file for complete search history.

(56) References Cited

U.S. PATENT DOCUMENTS

| | | | | |
|---|---|---|---|---|
| 5,306,032 A | * | 4/1994 | Hoblingre et al. | 280/775 |
| 5,394,767 A | * | 3/1995 | Hoblingre et al. | 74/493 |
| 5,605,351 A | * | 2/1997 | Higashino | 280/775 |
| 5,607,184 A | * | 3/1997 | Barton | 280/775 |
| 5,634,662 A | * | 6/1997 | Asayama | 280/777 |
| 5,730,465 A | * | 3/1998 | Barton et al. | 280/775 |
| 5,769,453 A | * | 6/1998 | Peitsmeier et al. | 280/775 |
| 5,788,277 A | * | 8/1998 | Hibino et al. | 280/775 |
| 5,845,936 A | * | 12/1998 | Higashino | 280/775 |
| 5,915,726 A | * | 6/1999 | Hibino et al. | 280/775 |
| 6,282,978 B1 | * | 9/2001 | Kurita | 74/493 |
| 6,357,318 B1 | * | 3/2002 | Koellisch et al. | 74/493 |
| 6,450,531 B1 | * | 9/2002 | Rinker et al. | 280/775 |
| 6,467,807 B2 | * | 10/2002 | Ikeda et al. | 280/775 |
| 6,623,036 B2 | * | 9/2003 | Yamamura et al. | 280/775 |

(Continued)

FOREIGN PATENT DOCUMENTS

| | | |
|---|---|---|
| EP | 1 468 895 A1 | 10/2004 |
| FR | 2 787 842 | 6/2000 |
| JP | 10-512826 | 12/1998 |
| JP | 2001-191927 | 7/2001 |
| JP | 2001347953 A * | 12/2001 |
| JP | 2002-59848 | 2/2002 |

(Continued)

*Primary Examiner*—Eric Culbreth
*Assistant Examiner*—Barry Gooden, Jr.
(74) *Attorney, Agent, or Firm*—Miles & Stockbridge PC (57) ABSTRACT

To provide a steering apparatus having an excellent operationality and capable of suppressing backlash and preventing an axis deviation of the steering shaft. A line R connecting the centers of two fixing members 16, 17 is shifted with respect to an axis line of an inner column 11, and thus a component Fv of a force transmitted from the fixing members 16, 17 to the inner column 11 via an outer column 21 is applied to press the inner column 11 in a direction orthogonal to the line R connecting the centers of the two fixing members 16, 17. It is, therefore, possible to reduce backlash between the inner column 11 and the outer column 21.

9 Claims, 7 Drawing Sheets

U.S. PATENT DOCUMENTS

| | | | |
|---|---|---|---|
| 6,637,771 B2 * | 10/2003 | Yoshimoto | 280/775 |
| 6,902,192 B2 * | 6/2005 | Sato et al. | 280/775 |
| 2002/0024208 A1 * | 2/2002 | Fujiu et al. | 280/775 |
| 2002/0026848 A1 * | 3/2002 | Kurita | 74/493 |
| 2002/0030356 A1 * | 3/2002 | Bohlen et al. | 280/777 |
| 2002/0079682 A1 * | 6/2002 | Yoshimoto | 280/775 |
| 2004/0075263 A1 * | 4/2004 | Muller | 280/775 |
| 2004/0113408 A1 * | 6/2004 | Yamamoto et al. | 280/775 |
| 2005/0104353 A1 * | 5/2005 | Ikeda et al. | 280/775 |
| 2005/0236825 A1 * | 10/2005 | Sawada et al. | 280/775 |

FOREIGN PATENT DOCUMENTS

| | | |
|---|---|---|
| JP | 2002-59849 A | 2/2002 |
| JP | 2002-59850 | 2/2002 |
| JP | 2002-87285 | 3/2002 |

* cited by examiner

STEERING DEVICE

TECHNICAL FIELD

The present invention relates to a tilt/telescopic type steering apparatus capable of adjusting a tilt angle of a steering wheel and an axis-directional position thereof, corresponding to a driving posture (position) of a driver.

BACKGROUND ART

What is known as a steering apparatus for an automotive vehicle is a tilt/telescopic type steering apparatus capable of adjusting a tilt angle of a steering wheel and an axis-directional position of the steering wheel, corresponding to a physique and a driving posture of a driver.

Here, there is an idea that components of the tilt/telescopic type steering apparatus are disposed as close to a steering shaft as possible in order to ensure a space in the vicinity of knees of the driver. Based on this idea, Japanese Patent Application Laid-Open No. 2001-191927 discloses a steering apparatus constructed such that support members disposed within a steering column are interposed between a pair of brackets and are displaced along tilt grooves formed in the brackets or along telescopic grooves formed in the steering column, and this caused the two brackets to get displaced in the same direction, thereby adjusting a tilt angle and an axis-directional displacement of the steering shaft supported rotatably with respect to the steering column.

Now, according to the prior art described above, the steering column is fixed by pressing one bracket against the steering column via an intermediate member. However, at this time, the other bracket is pressed via the support member, and this might cause an axis deviation of the steering shaft. A rigidity of the other bracket must be increased for preventing the axis deviation. However, this might induce rises both in weight and in cost. On the other hand, a presumable construction is that the two brackets are pressed from both sides against the steering column. However, this construction involves such a laborious operation that the driver must rotate two pieces of levers by hands, and there arises a problem in that the operationality declines. Also, there are demands for eliminating the causes of backlash, etc., occurring at the steering column.

DISCLOSURE OF INVENTION

The present invention has been made in view of the problems of these conventional techniques, and it is an object of the present invention to provide a steering apparatus capable of suppressing backlash, preventing an axis deviation of a steering shaft, and exhibiting excellency of its operationality.

In order to achieve the above object, according to the present invention, there is provided a steering apparatus for supporting a steering shaft to which a steering wheel is attached such that the steering shaft is changeable in axis-directional position and tilt angle, the steering apparatus including:

an inner column for supporting the steering shaft rotatably;

a pair of brackets fitted to a car body and disposed in positions facing each other with respect to an axis of the steering shaft;

a tension member extending between the pair of brackets;

two pieces of fixing members for fixing the tension member from outside of the pair of brackets;

a displacement causing member, disposed between the bracket and the fixing member, for causing a relative displacement between the bracket and the fixing member; and an outer column held on the car body through a connection between the tension member, the brackets and the fixing members, having a pressing portion of which an outer periphery is brought into contact with both of the pair of brackets due to the relative displacement of the brackets between at least the pair of brackets, and having an inner peripheral surface embracing an outer periphery of the inner column, wherein the pair of brackets interlocking with the tension member gets close to each other due to the displacement caused by the displacement causing member, a pressing force is thereby applied to the inner column via the pressing portion of the outer column, the inner column maintains its axis-directional position with respect to the brackets through the outer column, and furthermore, a line connecting centers of the two fixing members is shifted with respect to the axis line of the inner column.

According to the steering apparatus of the present invention, the pair of brackets gets close to each other by means of the displacement caused by the displacement causing member, with the result that a distance between the brackets decreases. The outer column is thereby held between the tension member and the brackets. Also, the displaced brackets apply a pressing force to the inner column via the pressing portion of the outer column, whereby the inner column is held by the brackets connected to the car body through the outer column. The steering shaft can be therefore fixed in the telescoping direction. Furthermore, the pair of brackets is connected to the tension member, and hence, if the two brackets take approximately a symmetrical configuration with respect to the steering shaft interposed therebetween, displaced quantities of the respective brackets are equalized. A central position of the inner column can be thereby kept substantially fixed, so that the axis deviation of the steering shaft can be effectively restrained. In addition, since a line connecting the centers of the two fixing members is shifted with respect to an axis line of the inner column, a component of a force transmitted from the fixing members to the inner column via the outer column is applied to press the inner column in a direction orthogonal to the line connecting the centers of the two fixing members. It is, therefore, possible to reduce backlash between the inner column and the outer column in a direction orthogonal to the fastening direction.

Furthermore, if the outer column is provided with a deformable part (for example, one slit 21e formed at the lower end part of the outer column 21 described below) deformable with the pressing portion between at least the pair of brackets at the side to which a line connecting centers of the two fixing members is shifted with respect to an axis line of the inner column, then it is possible to easily deform the outer column 21 by a small force using the principle of leverage with the opposite side of the deformable part across the axis line of the inner column, as a fulcrum.

Also, by forming tilt grooves on the pair of brackets, it becomes possible, for example, to perform tilt (swing) movement of the inner column integrally with the outer column.

Furthermore, if the outer column includes an integrally-formed car body fitting portion, it is possible to hold the inner column with respect to the car body via the outer column.

Also, if part of the inner column is formed with at least one elongate hole extending in an axial direction and an inner peripheral surface of the outer column is formed with a protruded portion engaging with the elongate hole and extending inward in a radial direction, it is possible for the inner column to perform telescopic (displacement in an axial direction) movement in a specified range.

Furthermore, if the tension member is constructed of a plurality of parts that can be divided so as to form an annular configuration embracing the outer column, the assembly becomes easy.

BEST MODE FOR CARRYING OUT THE INVENTION

Figure 1:
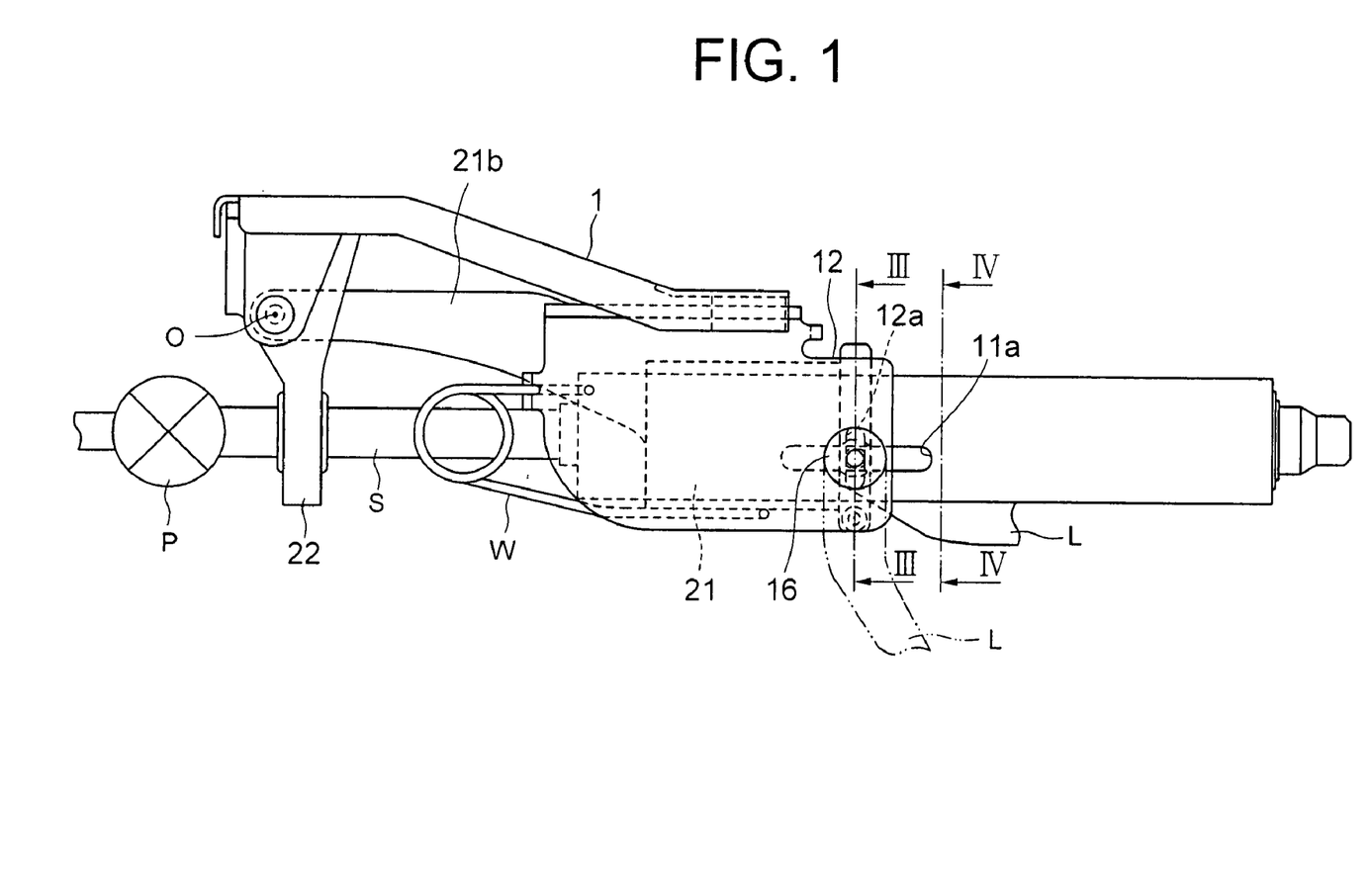
FIG. 1 is a side view of a tilt/telescopic type steering apparatus according to a first embodiment.
Figure 2:
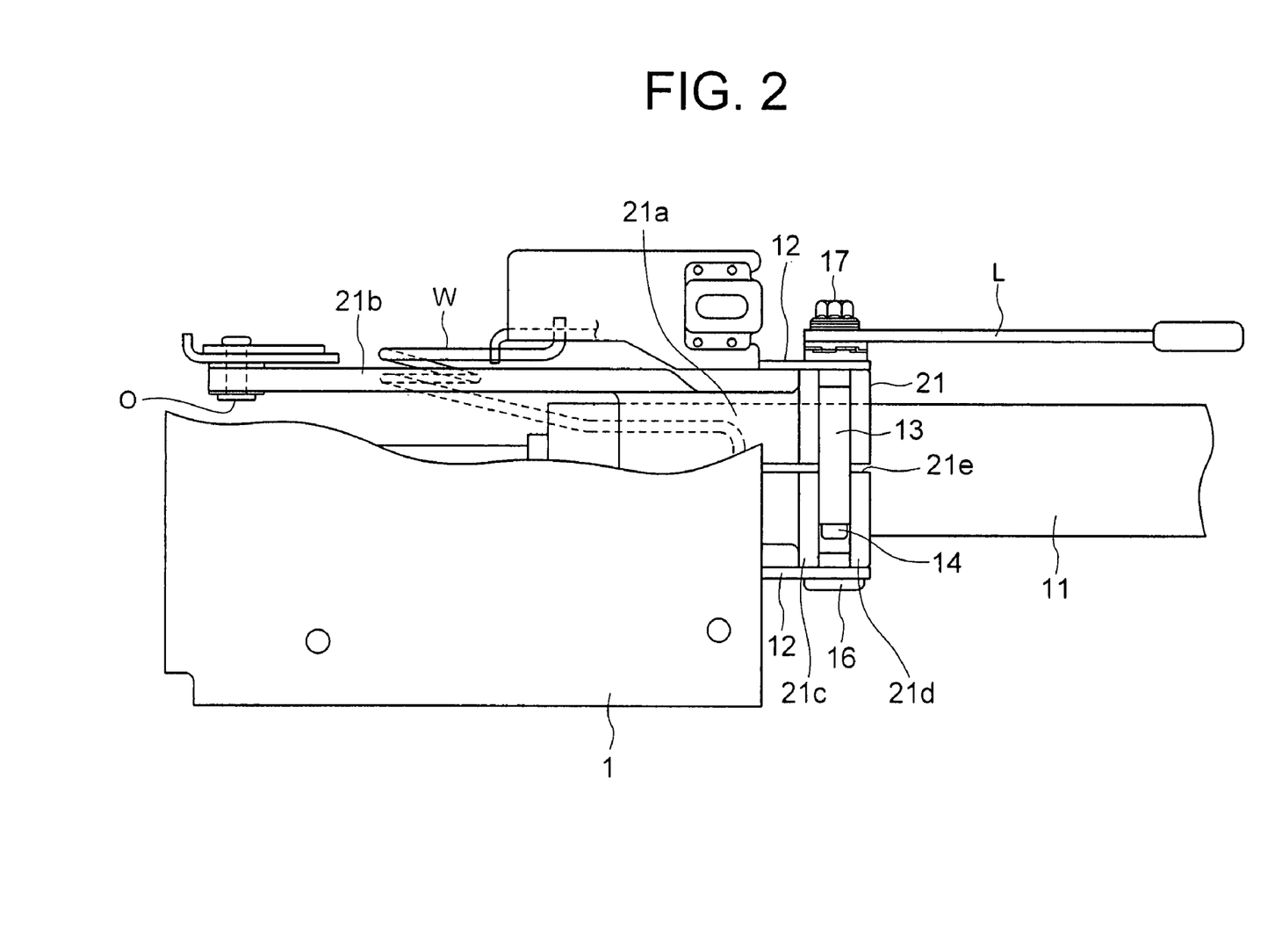
FIG. 2 is a top view of the steering apparatus shown in FIG. 1.
Figure 3:
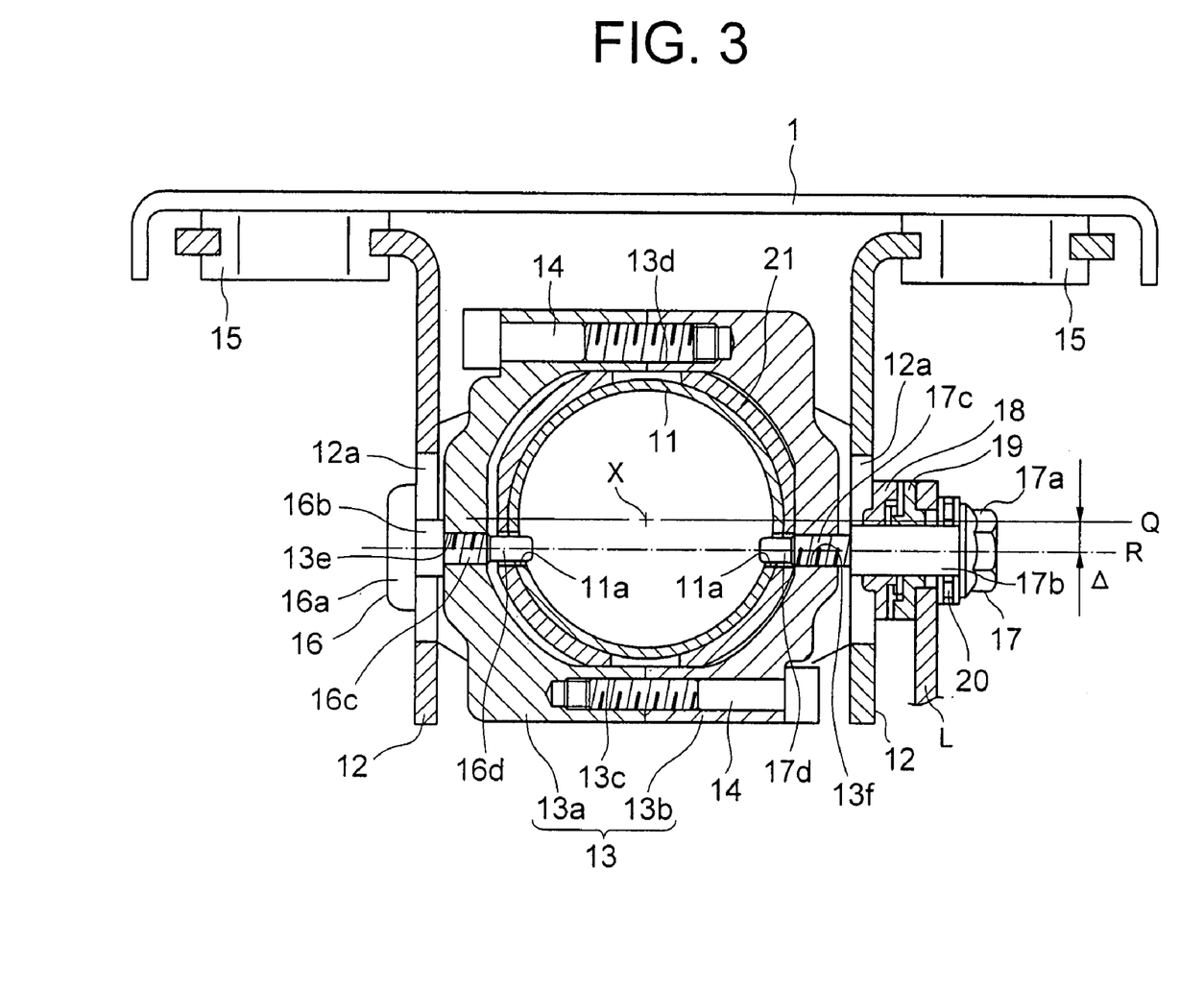
FIG. 3 is a view showing the configuration in FIG. 1, cut off by the line III-III as viewed in the arrow direction.
Figure 4:
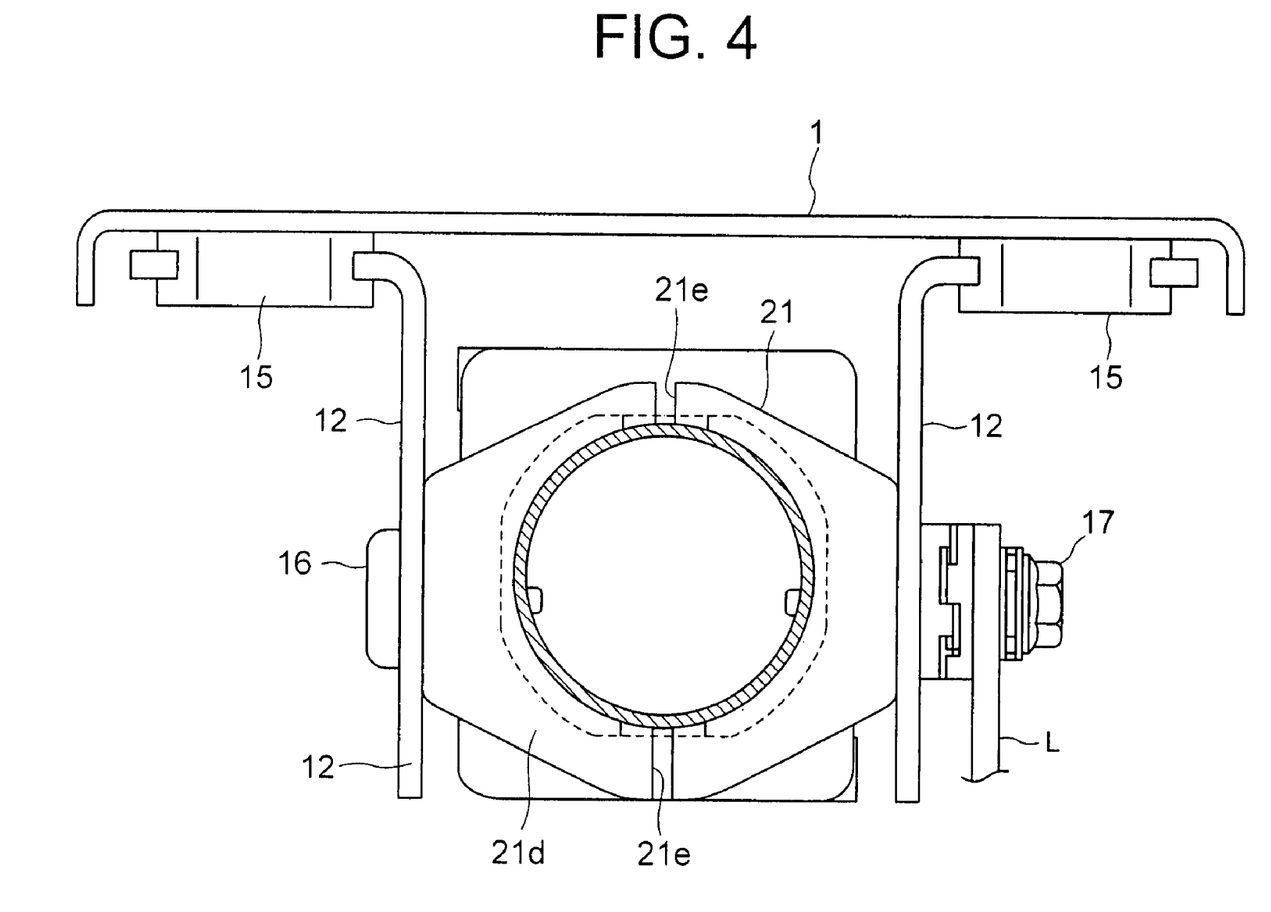
FIG. 4 is a view showing the configuration in FIG. 1, cut off by the line IV-IV as viewed in the arrow direction.
Figure 5:
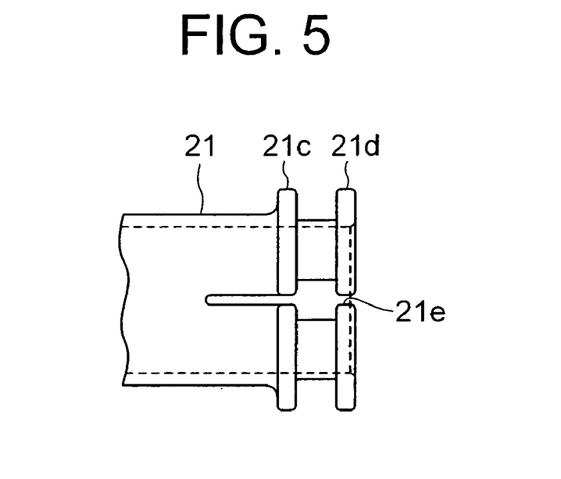
FIG. 5 is a bottom view of an end part of an outer column.

In the following, a description will be given of a tilt/telescopic type steering apparatus according to embodiments of the present invention with reference to the drawings. FIG. 1 is a side view of the tilt/telescopic type steering apparatus according to a first embodiment of the present invention. FIG. 2 is a top view of the steering apparatus shown in FIG. 1. FIG. 3 is a view showing the configuration in FIG. 1, cut off by the line III-III as viewed in the arrow direction, and FIG. 4 is a view showing the configuration in FIG. 1, cut off by the line IV-IV as viewed in the arrow direction. A steering shaft is omitted in the respective figures. FIG. 5 is a bottom view of an end part of an outer column, showing the shape of a slit 21e described below.

Referring to FIG. 3, two pieces of brackets 12 each composed of a plate material bent in an L-shape, are attached through a pair of release capsules 15 to a top plate 1 secured to an unillustrated car body. A plate thickness of each of the brackets 12 is the same, and the brackets 12 take a configuration exhibiting a line symmetry with respect to a perpendicular line. The release capsule 15, upon a secondary collision, functions such that the release capsule 15 gets collapsed when an impact load acts on an inner column 11 toward the front of the vehicle, and gets released together with the car body sided bracket 12 from the car body, thereby enabling the inner column 11 to get displaced toward the front of the vehicle.

A tension member 13 is disposed between the brackets 12, 12. The tension member 13 is a member taking substantially an annular shape in its assembled state. The tension member 13 can be divided at its center into two parts, i.e., a left-half tension member 13a and a right-half tension member 13b. To be more specific, two pieces of bolts 14 inserted through a screw hole 13c formed in the left-half tension member 13a and a screw hole 13d formed in the right-half tension member 13b, are fastened, thereby assembling the left-half tension member 13a and the right-half tension member 13b together. The tension member 13 can be thus acquired. Based on this construction, the left- and right-half tension members 13a, 13b remain separated before being mounted in the real car and made integral with each other when mounted in the real car by use of bolts 14, thereby enabling the assembly to be more facilitated.

A cylindrical inner column 11 is disposed inwardly of the tension member 13. A steering shaft (not shown in FIGS. 3 and 4) is inserted through within the inner column 11 and is rotatably supported via an unillustrated bearing within the inner column 11.

Telescopic grooves 11a are, as illustrated in FIG. 1, formed in parallel with the axis of the steering shaft S on both sides of the inner column 11. On the other hand, the bracket 12 is formed with a tilt groove 12a, and, in the assembled state, the telescopic groove 11a and the tilt groove 12a are partly overlapped with each other as viewed in the direction shown in FIG. 1. A fixing member 16 is inserted from the left side in FIG. 3 so as to penetrate the tilt groove 12a, while a fixing member 17 is inserted from the right side in FIG. 3.

The fixing member 16 includes a disc-like head portion 16a larger than a width of the tilt groove 12a on the left side in FIG. 3, a round-columnar tilt guided portion 16b engaging with and thus guided along within the tilt groove 12a, a male screw portion 16c screwed into a screw through-hole 13e formed in the left-half tension member 13a of the tension member 13, and a round-columnar telescopic guided portion 16d engaging with and thus guided along within the telescopic groove 11a on the left side in FIG. 3.

On the other hand, the fixing member 17 includes a head portion 17a, an elongate tilt guided portion 17b taking a cylindrical shape and having a diametrical dimension slightly smaller than a width of the tilt groove 12a, a male screw portion 17c screwed into a screw through-hole 13f formed in the right-half tension member 13b of the tension member 13, and an angular-pole-like telescopic guided portion 17d engaging with and thus guided along within the telescopic groove 11a on the right side in FIG. 3.

Provided along a periphery of the guided portion 17b of the fixing member 17 are a first cam member 18 that partly engages with the telescopic groove 11a and is therefore incapable of rotating, a second cam member 19 disposed adjacent to the first cam member 18, attached to a side end portion of a lever L and rotatable together with the lever L, and a bearing 20 interposed in between and held by the head portion 17a and the side end portion of the lever L. In this regard, the first cam member 18, the second cam member 19, and the lever L constitute a displacing member.

An outer column 21 has a cylindrical portion 21a, a pair of arm portions 21b (which are car body fitting portions of which only one is shown in FIG. 2) extending from the cylindrical portion 21a toward the left in FIG. 1, and a pair of flange portions 21c, 21d disposed at some interval in the axis-direction along an outer periphery of the right side end portion of the cylindrical portion 21a in FIG. 2. The cylindrical portion 21a embraces the inner column 11, and a side end portion of the arm portion 21b supported by a support member 22 on the unillustrated car body so as to be capable of swinging about a pivotal support point O. The tension member 13 is disposed between the flange portions 21c, 21d serving as a pressing portion. In this regard, as shown in FIG. 4, the cylindrical portion 21a is formed with a pair of slits 21e (appearing more exaggerated than in reality) in positions apart through 90 degrees from the fixing members 16, 17 so as to split the flange portions 21c, 21d from the right side ends thereof as shown in FIG. 5.

As illustrated in FIG. 1, a coil spring W is disposed between the bracket 12 and the outer column 21. The coil spring W biases the outer column 21 upward in FIG. 1 toward the bracket 12, thereby canceling a dead weight of the unillustrated steering wheel, etc., attached to the right side end of the steering shaft S.

In this regard, in the present embodiment, in a plane (that is to say, corresponding to the page face of FIG. 3) which includes a line R connecting the centers of the fixing members 16, 17 and is orthogonal to an axis line X of the inner column 11, the line R connecting the centers of the fixing members 16, 17 is shifted downward by a distance Δ in FIG. 3 with respect to a horizontal line Q passing through the axis line X of the inner column 11.

Next, a description will be given of an adjusting operation of the steering apparatus in the present embodiment. When an operator rotates the lever L in a fastening direction up to a position depicted by a solid line in FIG. 1, the protruded portions of the first cam member 18 and the second cam member 19 in the fixing member 17 engage with each other in FIG. 3, thereby generating a force acting in such directions as to separate from each other. At this time, the bracket 12 on the right side in FIG. 3, which is pressed by the first cam member 18, gets displaced to the left. While on the other hand, the fixing member 17 pressed rightward by the second cam member 19 displaces the tension member 13 toward the right. The tension member 13, with this displacement thereof, pushes the side portions of the flange portions 21c, 21d of the outer column 21 against both sides of the tilt grooves 12a of the brackets 12, thus giving proper pressing forces. The outer column 21 is thereby fixed to the brackets 12, with the result that tilt-directional displacement of the inner column 11 is blocked.

On the other hand, when the bracket 12 on the right side in FIG. 3, which has been pressed by the first cam member 18, gets displaced to the left as the lever L is rotated in the fastening direction, this bracket 12 abuts on right-half portions of the flange portions 21c, 21d and similarly displaces these portions to the left, thereby applying a pressing force to an outer peripheral surface of the inner column 11. Furthermore, the force given by the tension member 13 is transferred to the fixing member 16 disposed on the opposite side, whereby the bracket 12 on the left side in FIG. 3, which has been pressed by this force, gets displaced to the right. The left-side bracket 12, when getting displaced to the right, abuts on the left-half portions of the flange portions 21c, 21d and similarly displaces these portions to the right, thereby applying the pressing force to the outer peripheral surface of the inner column 11.

According to the present embodiment, the brackets 12 receive the forces in such directions as to have proximity to each other and make substantially the same amount of displacement. Then, the inner column 11 receives the pressing forces from both of the right and left sides in FIG. 3 via the flange portions 21c, 21d, and is fixed so that the center of the inner column 11 is coincident with such a position as to halve a distance between the brackets 12. With this arrangement, an axis deviation of the steering shaft S can be restrained while being capable of blocking the displacement in a telescoping direction. In this regard, in the present embodiment, since the slits 21e are formed upwardly and downwardly of the outer column 21, the rigidity of the outer column 21 decreases, and the flange portions 21c, 21d are easy to get displaced in the direction toward the inner column 11.

In contrast, when the operator rotates the lever L in a slacking direction down to a position depicted by a two-dotted chain line in FIG. 1, the protruded portions of the first cam member 18 and the second cam member 19 disengage from each other in FIG. 3, resulting in a return to the initial distance D from the head portion 17a of the fixing member 17 to the side end surface of the bracket 12. This causes the bracket 12 to separate away from the tension member 13 with the result that the outer column 21 comes to a free state with respect to the bracket 12. Therefore, the tilt guided portions 16b, 17b of the fixing members 16, 17 are displaced while being guided along the tilt grooves 12a of the brackets 12, or alternatively the telescopic guided portions 16d, 17d are displaced while being guided along the telescopic grooves 11a of the inner column 11, whereby the adjustment in the tilting direction and in the telescopic direction can be arbitrarily made. In this regard, the telescopic guided portions 16d, 17d constitute the protruded portions inwardly protruding in a radial direction to engage with the telescopic grooves 11a, 11a.

Figure 6:
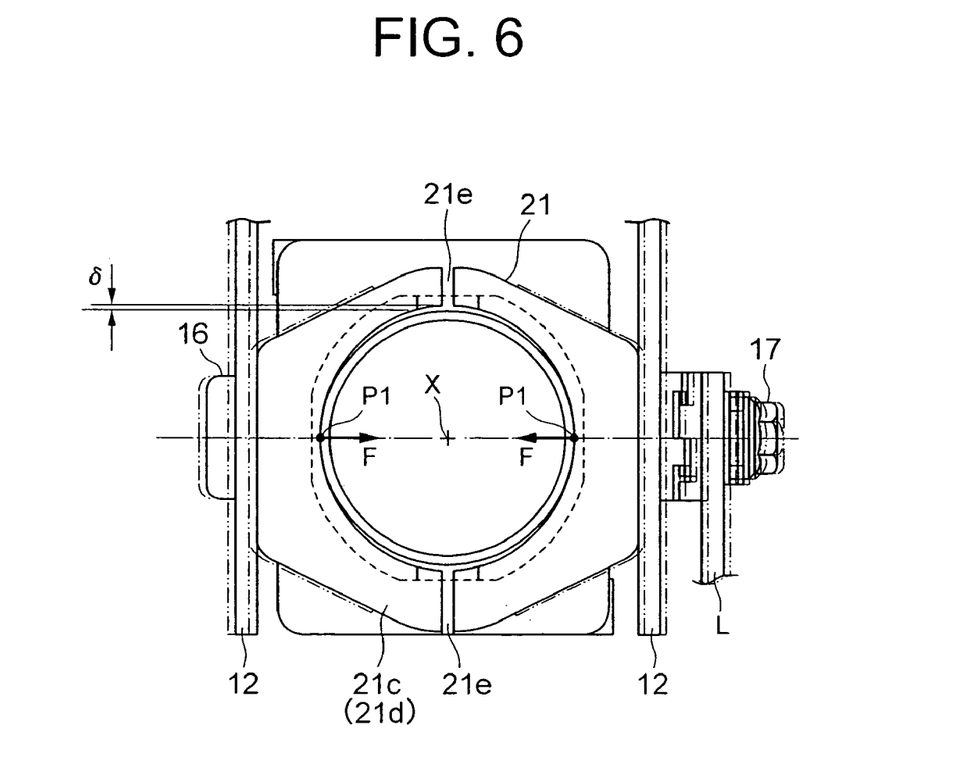
FIG. 6 is a view, similar to FIG. 4, showing a relationship between an outer column and an inner column as a comparative example.
Figure 7:
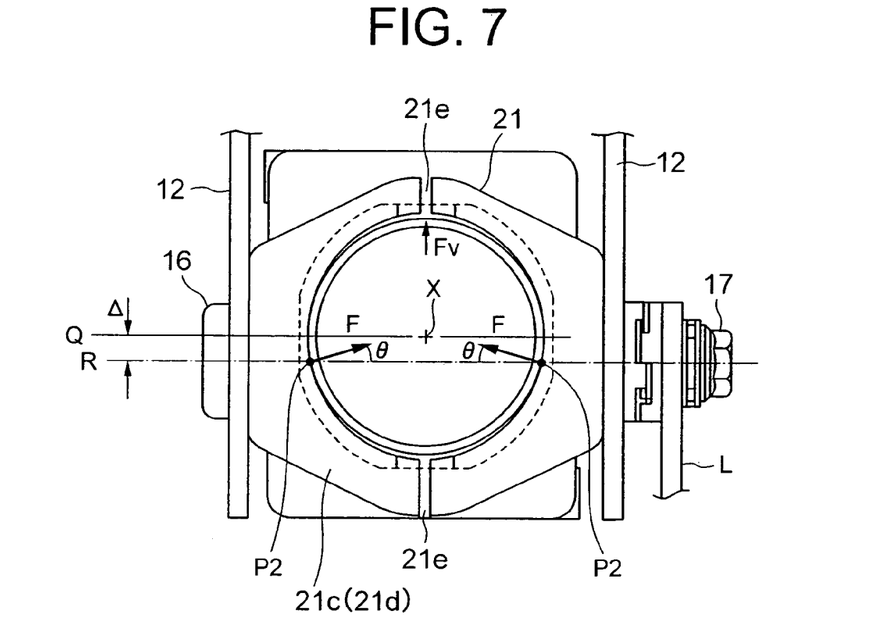
FIG. 7 is a view, similar to FIG. 4, showing a relationship between an outer column and an inner column according to the present embodiment.

Furthermore, a description will be given of characteristics of the present embodiment by comparing with a comparative example. FIG. 6 is a view, similar to FIG. 4, showing a relationship between the outer column and the inner column as a comparative example. FIG. 7 is a view, similar to FIG. 4, showing a relationship between the outer column and the inner column according to the present embodiment. In the comparative example shown in FIG. 6, the centers of the fixing members 16, 17 intersect the axis line X of the inner column 11.

Referring to FIG. 6, suppose that both sides of the brackets 12 are displaced from a position shown by a two-dotted line to another position shown by a solid line to displace the outer column 21 in a direction in which the upper and lower slits 21e are closed based on the rotation of the lever L in the fastening direction. Here, suppose that there is a gap δ between the outer column 21 and the inner column 11 in an initial state, the outer column 21 fastens the inner column 11 such that the gap in a horizontal direction becomes zero. However, after the outer column 21 abuts on the inner column 11 at point P1, the gap of the other portion does not decrease, unless the inner column 11 is deformed. That is to say, in the vicinity of the slits 21e, the initial gap δ remains without change. Accordingly, the inner column 11 is only supported by the two points P1, and thus the inner column 11 might have backlash in a vertical direction, unless the inner column 11 is supported by such a strong pressing force that the inner column 11 is deformed.

In contrast, according to the present embodiment shown in FIG. 7, a line R connecting the fixing members 16, 17 is shifted downward by a distance Δ in FIG. 7 with respect to a horizontal line Q passing through the axis line of the inner column 11. Therefore, suppose that the brackets 12 of both sides are deformed so that the outer column 21 abuts on the inner column 11 at points P2 based on the rotation of the lever L in the fastening direction, the pressing force F is directed to the center, and thus a vertical component of the force is applied to the inner column 11. Assuming this component force is Fv, Fv can be expressed as Fv=2×F·sin θ {Note that θ is an angle formed by the line R and the direction of the pressing force F}. That is to say, since the component force Fv in accordance with the pressing force F and the angle θ is applied to the inner column 11, the inner column 11 is pushed upward (in a direction orthogonal to the line R). Thus, it is possible to decrease the gap between the inner column 11 and the outer column 21. Accordingly, it is possible to obtain the effect of suppressing backlash of the inner column 11 without increasing the pressing force F of the fixing members 16, 17. In this regard, the upward displacement of the inner column 11 in such a case is very small, and thus an axis deviation of the steering shaft S might not occur. However, adjustment may be made such that the axis center of the steering shaft S is located at a predetermined position in a state in which the inner column 11 is held by being displaced upward. In this regard, the fixing members 16, 17 may be arranged such that the line R is located above the line Q.

Figure 8:
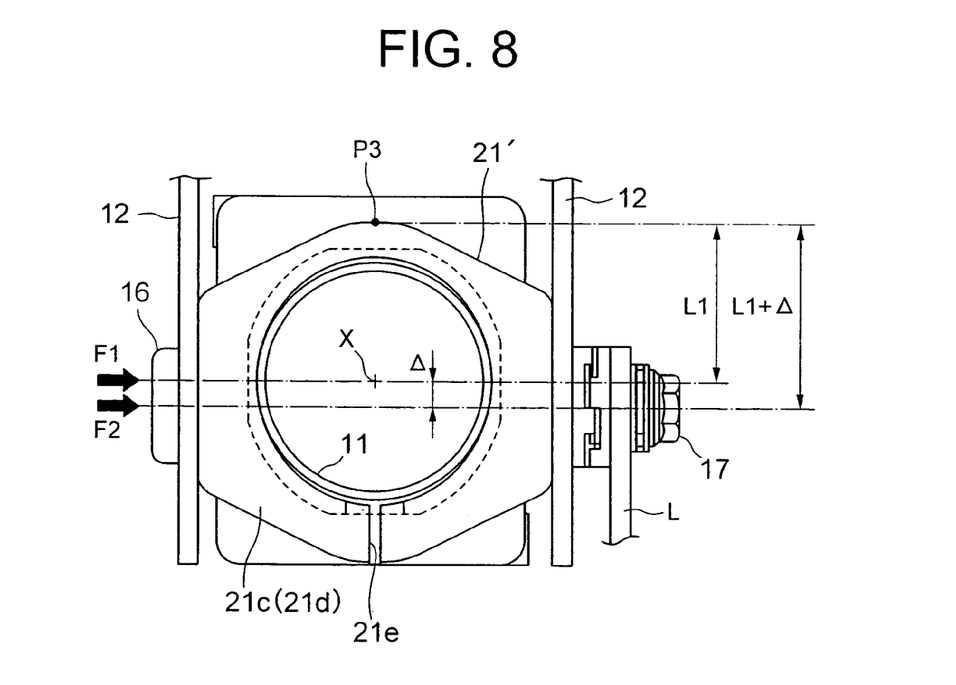
FIG. 8 is a view, similar to FIG. 7, of a tilt/telescopic type steering apparatus according to a second embodiment.

FIG. 8 is a view, similar to FIG. 7, of a tilt/telescopic type steering apparatus according to a second embodiment of the present invention. The present embodiment is different from the above-described embodiment merely in the point in which the slit 21e of the outer column 21' is provided only at the lower side, and thus common components other than that are marked with the same numerals and symbols, the descriptions of which are omitted.

In the present embodiment, since the outer column 21' does not have an upper slit, when a pressing force is applied to the outer column 21' from the both sides in FIG. 8, flange parts 21c, 21d are deformed to close the lower slit 21e with a fulcrum point P3 as a center, thereby making it possible to hold the inner column 11.

Here, in the comparative example, shown in FIG. 6, in which the centers of the fixing members 16, 17 intersect the axis line of the inner column 11, assuming that a pressing force, which is given by the fixing members 16, 17 necessary for holding the inner column 11 is F1, a pressing force F2, which is given by the fixing members 16, 17, necessary for holding the inner column 11 in the present embodiment in which the line R connecting the centers of the fixing members 16, 17 is shifted downward by the distance Δ in FIG. 8 with respect to the axis line X of the inner column 11 is expressed as $$F2=(L1/(L1+\Delta))\cdot F1$$

{Note that L1 is a distance from the point P3 to the axis line X}. Here, since L1<L1+Δ, according to the present embodiment, it becomes possible to hold the inner column 11 by a smaller pressing force F2 using the principle of leverage. In this regard, the slits 21e may be disposed only at the upper side, and in this case, the fixing members 16, 17 should be disposed such that the line R is located above the line Q.

In this regard, as a modification of the present embodiment, the outer column 21 is provided with a pin-attached bolt (not shown) as a protruded portion extending in the radial direction, and the pin portion thereof engages with an elongate hole (not shown) formed on the inner column 11. With this arrangement, when the inner column 11 and the outer column 21 get displaced in their axial directions, the pin portion abuts on the end portion of the elongate hole of the inner column 11 and thus functions as a telescoping stopper for blocking further displacements thereof. Note that the inner column 11 may be formed with a telescoping stopper as a protruded portion, and relative displacements may be blocked by abutting on the outer column 21.

Figure 9:
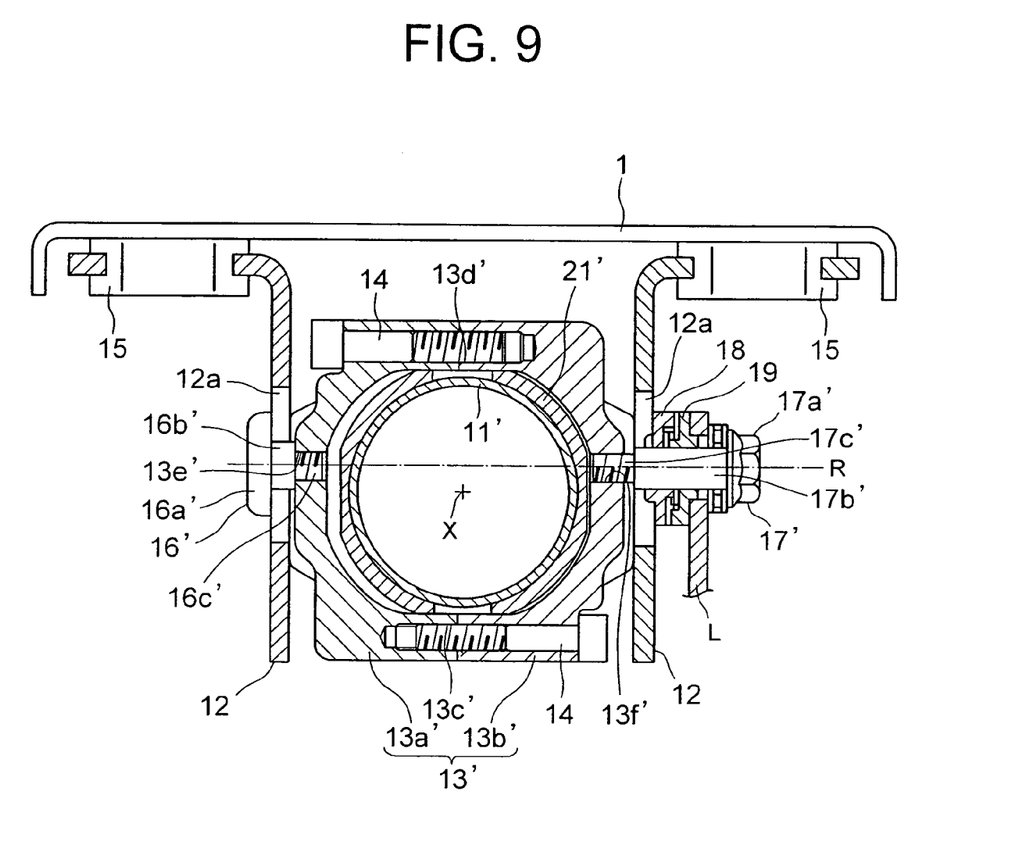
FIG. 9 is a view, similar to FIG. 3, of a tilt/telescopic type steering apparatus according to a third embodiment of the present invention.

FIG. 9 is a view, similar to FIG. 3, of a tilt/telescopic type steering apparatus according to a third embodiment of the present invention. In the present embodiment, a line R connecting centers of the fixing members 16', 17' is shifted upward in FIG. 9 with respect to the axis line X of the inner column 11. Also, the fixing members 16', 17' are not provided with telescopic guided portions, the ends thereof are not inserted in the outer column 21' and the inner column 11'. Accordingly, it is not necessary to provide the outer column 21' and the inner column 11' with telescopic grooves, respectively. The other components are common with those of the structure shown in FIG. 3, thus they are marked with the same numerals and symbols, and the descriptions thereof are omitted.

The present invention has been explained in depth so far with reference to the embodiments. The present invention should not, however, be construed as limited to the embodiments described above and can be, as a matter of course, modified and improved properly within the range that does not spoil the gist of the invention. For example, if teeth meshing with each other at every predetermined angle are formed on face-to-face surfaces of the brackets 12 and of the flange portions 21c, 21d, when fastening the lever L, the retaining force can be further increased.

The invention claimed is:

1. In a steering apparatus supporting a steering shaft to which a steering wheel is attached such that the steering shaft is changeable in axis-directional position, the steering apparatus comprising:
    an inner column supporting the steering shaft rotatably;
    a pair of brackets fitted to a vehicle body and disposed in positions facing each other with respect to an axis of the steering shaft;
    a tension member extending between the pair of brackets;
    two fixing members fixing the tension member from outside of the pair of brackets;
    a displacement causing member, disposed between the tension member and one of the fixing members, causing a relative displacement between the pair of brackets; and
    an outer column held on the vehicle body through a connection between the tension member, the brackets and the fixing members, having a pressing portion between the pair of brackets, of which an outer periphery is engaged with both of the pair of brackets due to relative displacement of the brackets, and having an inner peripheral surface embracing an outer periphery of the inner column,
    wherein the pair of brackets cooperating with the tension member approach one another due to displacement caused by the displacement causing member, a pressing force is thereby applied to the inner column via the pressing portion of the outer column, the inner column maintains its axis-directional position with respect to the brackets through the outer column,
    furthermore, a straight line connecting centers of the two fixing members and extending through the outer column and the inner column is shifted with respect to the longitudinal axis line of the inner column, and the tension member is provided outside to said outer column, and
    wherein a slit extends on at least one of an upper side and a lower side of the outer column, and the line connecting centers of the two fixing members is shifted to the side of one of the slits with respect to the longitudinal axis line of the inner column.

2. The steering apparatus according to claim 1, wherein each one of the pair of brackets is formed with tilt grooves.

3. The steering apparatus according to claim 1, wherein the outer column includes an integrally-formed vehicle body fitting portion.

4. The steering apparatus according to claim 1, wherein part of the inner column is formed with at least one elongate hole extending in an axial direction, and an inner peripheral surface of the outer column is formed with a protruded portion engaging with the elongate hole and extending inward in a radial direction.

5. The steering apparatus according to claim 1, wherein the tension member is constructed of a plurality of parts that form an annular configuration embracing the outer column.

6. The steering apparatus according to claim 1, wherein the tension member is disposed outwardly along a radial direction to the inner column.

7. A steering apparatus according to claim 1, wherein said tension member has surfaces disposed between a pair of parts of said pressing portion which are axially spaced on said outer column.

8. A steering apparatus according to claim 1, wherein said displacement causing member includes a pair of cooperating cam members.

9. A steering apparatus according to claim 8, wherein said displacement causing member includes a lever which actuates said pair of cooperating cam members, one of which is rotatable relative to the other in response to rotation of said lever, and wherein said line that connects centers of said two fixing members constitutes a rotational axis of said lever and said rotatable cam member.

* * * * *